US005577435A

United States Patent [19]
Kowalyk et al.

[11] Patent Number: 5,577,435
[45] Date of Patent: Nov. 26, 1996

[54] HIGH FLOW HYDRAULIC CIRCUIT FOR TRACTORS

[75] Inventors: Vladimir M. Kowalyk; G. Paul Zanetel, both of Winnipeg, Canada

[73] Assignee: New Holland North America, Inc., New Holland, Pa.

[21] Appl. No.: 613,649

[22] Filed: Mar. 11, 1996

[51] Int. Cl.$^6$ .................................................. F15B 11/00
[52] U.S. Cl. .................................. 91/516; 91/532; 60/421
[58] Field of Search ........................... 91/508, 511, 514, 91/516, 519, 532; 60/421

[56] References Cited

U.S. PATENT DOCUMENTS

| | | | |
|---|---|---|---|
| 4,343,151 | 8/1982 | Lorimor | 91/516 X |
| 4,966,066 | 10/1990 | Kauss et al. | 91/516 |
| 5,460,000 | 10/1995 | Kropp | 91/516 X |
| 5,471,908 | 12/1995 | Lech | 91/516 |

*Primary Examiner*—Hoang Nguyen
*Attorney, Agent, or Firm*—Larry W. Miller; Frank A. Seemar

[57] ABSTRACT

A hydraulic circuit is disclosed for a tractor in which a steering circuit and an implement circuit are utilized to provide a high flow capability to the implement valve stack. A series of priority valves are operable to divert hydraulic flow from the steering circuit to the implement circuit under conditions where the steering mechanism is not being operated and the implement circuit pump is operating at full capacity. The first priority valve diverts the hydraulic flow from the steering circuit to a second priority valve that is controlled by a pressure differential valve that senses the implement circuit pump working at full displacement, whereupon the second priority valve directs the diverted hydraulic flow into the implement circuit. The first priority valve retains hydraulic flow within the steering circuit whenever the steering mechanism is being operated. The second priority valve directs the diverted hydraulic flow back to the reservoir unless the implement circuit pump is operating at full capacity.

13 Claims, 3 Drawing Sheets

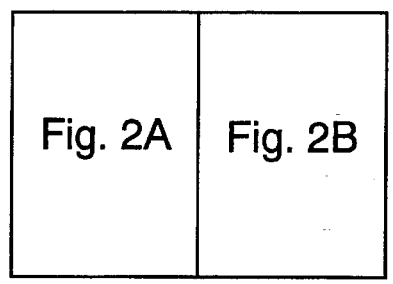
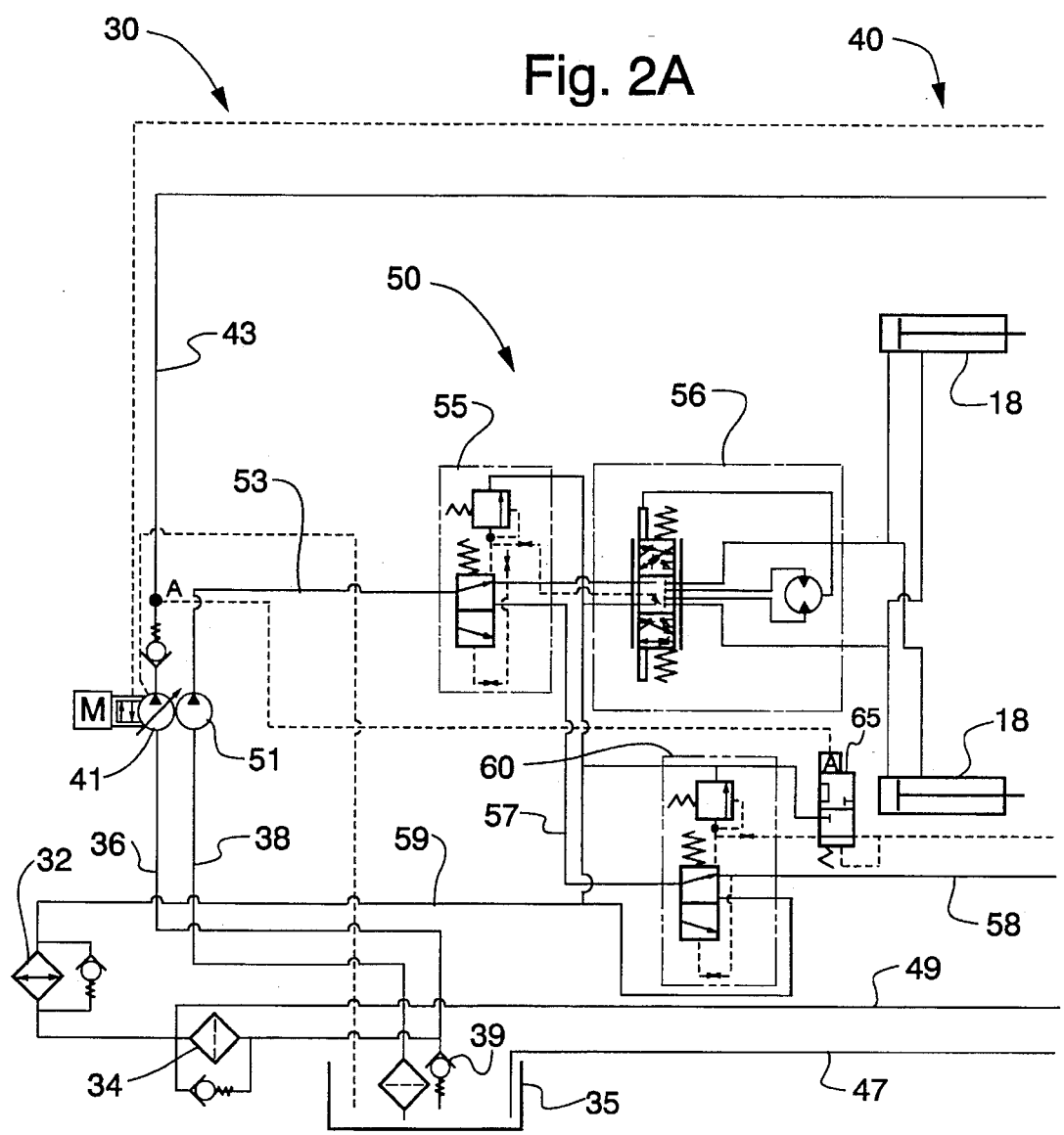
Fig. 2
Fig. 2A

HIGH FLOW HYDRAULIC CIRCUIT FOR TRACTORS

BACKGROUND OF THE INVENTION

This invention relates generally to off-road motor vehicles, such as tractors, and more particularly, to a hydraulic circuit for providing a high flow to tractor control valves operatively coupled to an attached implement.

Tractors are typically detachably connected to implements, such as harvesting machines or tillage implements, that are provided with hydraulically powered devices that are coupled in flow communication to the tractor hydraulic system through a hydraulic valve stack so that the implement is hydraulically powered through the tractor hydraulic system. In some instances, the hydraulic power required to operate the implement places a strain on the capabilities of the tractor hydraulic system.

It would be desirable to provide a hydraulic circuit that would be operable to divert hydraulic flow from other hydraulic systems on the tractor, when those systems do not require hydraulic power, to supplement the capability of the tractor hydraulic system to meet the power demands of the implement hydraulics.

SUMMARY OF THE INVENTION

It is an object of this invention to overcome the aforementioned disadvantages of the prior art by providing a tractor hydraulic circuit to provide a means for diverting hydraulic flow under certain conditions to meet the power demand of the implement attached thereto.

It is another object of this invention to provide a tractor hydraulic circuit that provides an increased hydraulic flow to the implement hydraulics when other tractor hydraulic systems do not require the hydraulic power.

It is a feature of this invention that the tractor hydraulic circuit diverts the flow from the hydraulic steering mechanism to the implement circuit when the steering mechanism is not being operated.

It is an advantage of this invention that a priority valve senses the demand for hydraulic fluid in the steering mechanism and diverts hydraulic fluid from the steering mechanism only when the steering mechanism is not being operated.

It is another advantage of this invention that the tractor hydraulic circuit supplying hydraulic fluid to the implements also includes a priority valve that diverts the flow of diverted hydraulic fluid back to the reservoir if not needed by the implement.

It is another feature of this invention that the tractor hydraulic circuit supplying diverted hydraulic fluid to the implement valves includes a pressure differential sensing valve that is operable to control the associated priority valve to direct diverted hydraulic fluid into the implement valve stack only when the implement power demand is greater than the capability of the implement hydraulic circuit without the diverted hydraulic flow.

It is still another advantage of this invention that the pressure differential sensing valve monitors the pressure differential between the implement hydraulic circuit pump and the pressure at the implement valve stack, such that the diverted hydraulic flow from the steering mechanism is utilized in the implement circuit only when the pressure differential is less than the minimum setting for the implement circuit pump.

It is yet another feature of this invention that the diverted hydraulic flow from the steering mechanism is utilized in the implement circuit only when the implement circuit pump is at full displacement.

It is yet another object of this invention to provide a tractor hydraulic circuit for diverting hydraulic fluid from unused system under high flow demand conditions which is durable in construction, inexpensive of manufacture, carefree of maintenance, facile in assemblage, and simple and effective in use.

These and other objects, features and advantages are accomplished according to the instant invention by providing a hydraulic circuit for a tractor in which a steering circuit and an implement circuit are utilized. A series of priority valves are operable to divert hydraulic flow from the steering circuit to the implement circuit under conditions where the steering mechanism is not being operated and the implement circuit pump is operating at full capacity. The first priority valve diverts the hydraulic flow from the steering circuit to a second priority valve that is controlled by a pressure differential valve that senses the implement circuit pump working at full displacement, whereupon the second priority valve directs the diverted hydraulic flow into the implement circuit. The first priority valve retains hydraulic flow within the steering circuit whenever the steering mechanism is being operated. The second priority valve directs the diverted hydraulic flow back to the reservoir unless the implement circuit pump is operating at full capacity.

BRIEF DESCRIPTION OF THE DRAWINGS

The advantages of this invention will be apparent upon consideration of the following detailed disclosure of the invention, especially when taken in conjunction with the accompanying drawings wherein:

FIG. 2 is a diagram showing the arrangement required of FIGS. 2A and 2B to combine the FIGS. to create a complete hydraulic circuit;

FIG. 2A is the left half of a schematic diagram of the hydraulic circuit incorporating the principles of the instant invention, the steering circuit being wholly contained therein.

DETAILED DESCRIPTION OF THE PREFERRED EMBODIMENT

Figure 1:
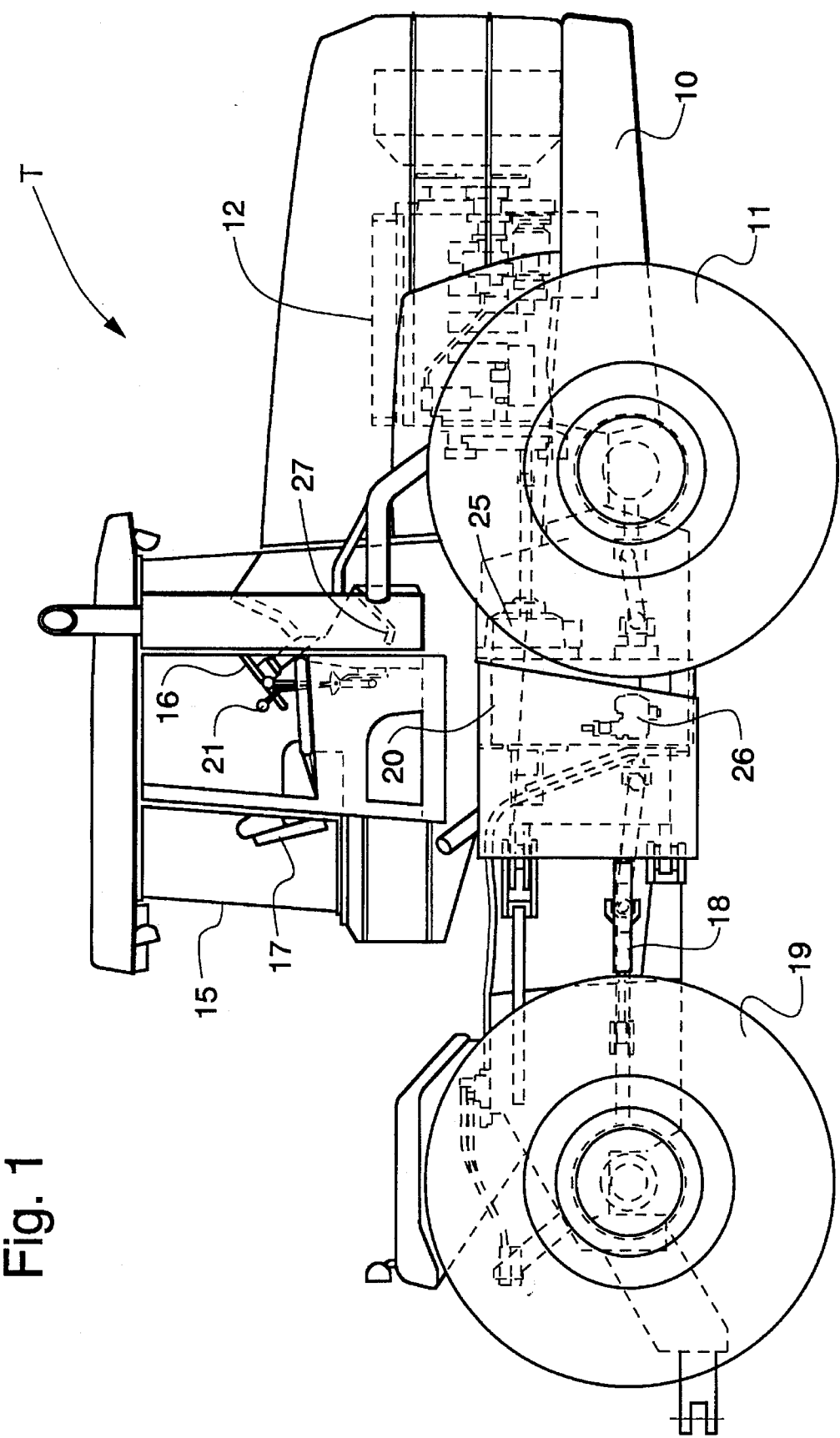
FIG. 1 is a side elevational view of a tractor incorporating the principles of the instant invention.

Referring now to the drawings and, particularly, to FIG. 1, a representative view of an agricultural tractor incorporating the principles of the instant invention can best be seen. Left and right references are used as a matter of convenience and are determined by standing at the rear of the tractor and facing the forward end in the normal direction of travel. The tractor chassis 10 is supported above the ground in a conventional manner by front wheels 11, which on large tractors are typically drivingly powered, and rearward drive wheels 19 rotatably mounted in a customary transversely spaced orientation.

The chassis supports a conventional engine 12 serving to provide operational power for the tractor T and an operator's cab 15 positioned in an elevated location. The operator's cab 15 includes a steering wheel 16, positioned forwardly of the conventional operator's seat 17, to operate the steering of the tractor T through manipulation of the hydraulic cylinder 18 controlling the articulation of the tractor chassis 10 in a known conventional manner. The operator's cab 15 is also provided with conventional operative controls, such as the transmission control lever 21, to permit the operative control of the tractor T.

The tractor T is provided with a transmission 20 supported on the chassis 10 to receive rotational power from the engine 12 and transfer rotational power to the front and rear wheels 11, 19 at selected speeds of operation. The transmission control lever 21, which is mounted in the operator's cab 15 within normal reach of the operator's seat 17, effects a shifting of the available speeds of operation through a conventional push/pull cable (not shown).

A master clutch 25 is mounted on the transmission 20 and is operatively associated therewith to control the application of operative power from the engine 12 to the transmission 20 in a conventional manner. The master clutch 25 is hydraulically controlled through the operation of the control valve 26, which is also mounted on the transmission 20 in a manner described in greater detail below and is operated in a conventional manner by the clutch pedal 27 located in the operator's cab 15.

Figure 2B:
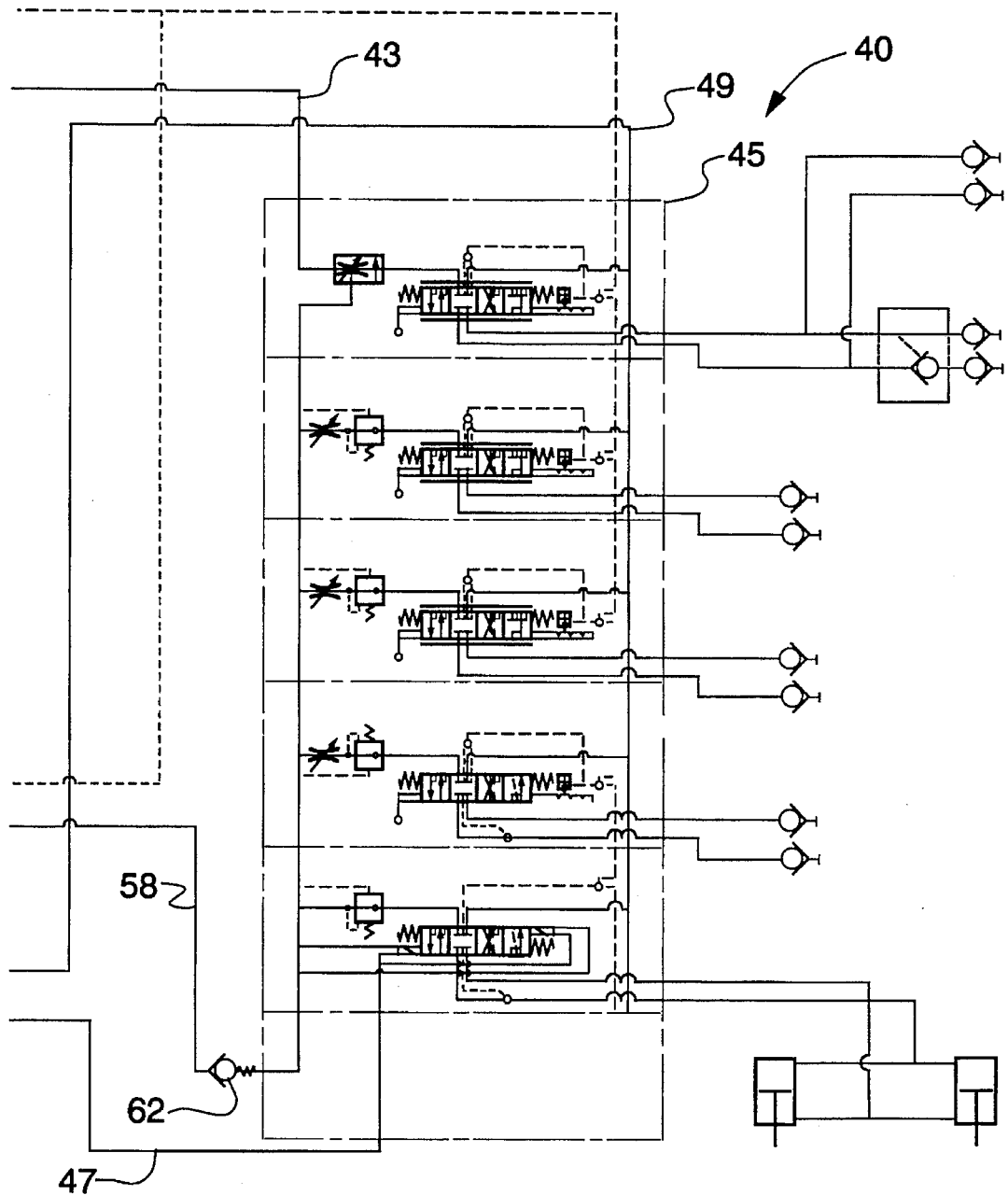
FIG. 2B is the right half of a schematic diagram of the hydraulic circuit incorporating the principles of the instant invention, depicting primarily the implement valve block and a part of the implement circuit.

Referring now to the schematic diagrams of FIGS. 2, 2A and 2B, the details of the tractor hydraulic system 30 can best be seen. The tractor hydraulic circuit 30 includes an implement circuit 40 and a steering circuit 50, both of which draw hydraulic fluid from a reservoir 35. The tractor hydraulic circuit 30 further includes a cooling mechanism 32 and a filter 34 arranged in series to cool and filter the hydraulic fluid passing therethrough before being re-circulated into the hydraulic circuit 30.

The implement circuit 40 includes a variable displacement, pressure and flow compensated, piston pump 41 that is operable to supply hydraulic fluid under pressure from the steering circuit return line 59, and ultimately from the reservoir 35, through intake line 36 to a conventional implement remote valve stack 45 via line 43. As will be recognized by one skilled in the art, the hydraulic devices (not shown) on the implement (not shown) are connected to the tractor hydraulic system 30 through the respective remote valves in the conventional valve stack 45.

The variable displacement piston pump 41 provides hydraulic fluid as demanded by the devices (not shown) coupled in flow communication with the valve stack 45. One skilled in the art will further recognize that the implement devices (not shown) may require more power from the pump 41 that the pump 41 can supply. Hydraulic fluid utilized through the implement valve stack 45 is returned to the reservoir 35 via return line 49 through the filter 34. Hydraulic fluid not used in the valve stack 45 is returned to the reservoir 35 via the return line 47.

The steering circuit 50 includes a fixed displacement gear pump 51 that is operable to supply hydraulic fluid under pressure from the reservoir 35 through intake line 38 to a first priority valve 55 via line 53. The first priority valve 55, through a conventional operation of a steering valve 56, is operable to sense a demand for hydraulic fluid from the steering cylinders 18 actuated by a turning of the steering wheel 16 to effect a steering of the tractor T. When the steering valve 56 detects a demand from the hydraulic cylinders 18, the priority valve 55 is shifted so that hydraulic fluid is directed into the steering valve 56 for operation of the steering cylinders 18 in a conventional manner. Hydraulic fluid is then return to the reservoir 35 through the cooler 32 and the filter 34 via the return line 59.

If no demand from the steering cylinders 18 is sensed, the first priority valve 55 diverts hydraulic fluid through the bypass line 57 to a second priority valve 60, which is controlled by a pressure differential sensing valve 65 that senses the pressure differential between the implement circuit pump 41 at point A and the pressure at the implement valve stack 45. If pressure differential sensing valve 65 detects a pressure differential that is less than the minimum setting for the implement circuit pump 41, which indicates that the variable displacement implement circuit pump 41 is working at full capacity, the second priority valve 60 is shifted to divert the hydraulic flow through bypass line 57 into the crossover line 58 which passes through check valve 62 and adds additional hydraulic fluid under pressure to the implement valve stack 45. The check valve 62 insures that hydraulic fluid will not back flow from the implement circuit 40 into the steering circuit 50.

If the variable displacement piston pump 41 in the implement circuit 40 is operating at less than full capacity, and, therefore, can handle the power demand from the implement valve stack 45, the pressure differential sensing valve 65 keeps the second priority valve 60 directing hydraulic fluid coming through bypass line 57 into the return line 59 and, subsequently, into the reservoir 35 through the check valve 39, unless drawn into the implement circuit 40 through intake line 36 by the implement circuit pump 41. As a result, the hydraulic fluid diverted from the steering circuit 50 is used on an intermittent basis and only when required to meet the demand at the implement valve stack 45, and also only when the steering cylinders 18 do not require the flow from the gear pump 51.

One skilled in the art will readily realize that the pressure differential sensing valve 65 can be set to be operable through pressure differential from different points in the implement circuit and to be operable to shift the second priority valve 60 at some point less than full capacity of the piston pump 41. For example, the pressure differential sensing valve 65 could be set to shift the second priority valve 60 to direct flow into the implement circuit 40 when the piston pump 41 achieves 80% of its displacement capacity, instead of at 100% capacity. Furthermore, the first priority valve 55 will preferably be set to give priority to the steering cylinders 18 of all the hydraulic flow required thereby, with all remaining flow, if any, being diverted to the second priority valve 60.

Accordingly, the tractor hydraulic system 30 will be operable to provide a high hydraulic flow to the implement valve stack as necessary without requiring an oversized, and more expensive, piston pump 41 having a capacity that is only necessary on an intermittent basis. One skilled in the art will realize that, from a practical matter, the demand for high flow from the implement valve stack 45, which normally corresponds with substantial implement activity, does not normally occur at the same time as substantial steering maneuvers requiring operation of the steering cylinders and the full utilization of the gear pump 51 flow. Such steering activity typically occurs at the headlands of a field when the implement, whether a harvester, tillage device or other configuration, is inactive.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description may be employed in other embodiments without departing from the scope of the invention. Accordingly, the following claims are intended to protect the invention broadly as well as in the specific form shown.

Having thus described the invention, what is claimed is:

1. A hydraulic circuit for a tractor having a hydraulically operated steering mechanism and at least one hydraulic remote valve, said hydraulic circuit having a reservoir, comprising:

an implement circuit supplying a flow of hydraulic fluid under pressure to said at least one remote valve, including:
      a variable displacement piston pump supplying hydraulic fluid under pressure on demand, said piston pump having a maximum displacement capacity; and
      hydraulic lines interconnecting said piston pump, said at least one remote valve, and said reservoir to convey hydraulic fluid therebetween; and
   a hydraulic steering circuit including:
      a fixed displacement gear pump supplying a substantially constant flow of hydraulic fluid under pressure;
      a first priority valve in flow communication with said gear pump and being operable to direct hydraulic fluid to said steering mechanism upon demand therefrom, said first priority valve being operable to divert excess hydraulic flow not demanded by said steering mechanism through a bypass line;
      a second priority valve in flow communication with said bypass line to receive said diverted excess hydraulic flow therefrom; and
      a pressure differential sensing valve operably connected to said second priority valve to control the operation thereof, said pressure differential sensing valve being operable to sense an instantaneous displacement of said piston pump in said implement circuit, said second priority valve being operable to direct said diverted hydraulic flow from said first priority valve through a crossover line to said implement circuit when said pressure differential sensing valve detects an instantaneous displacement of said piston pump greater than a predetermined limit, said second priority valve returning said diverted hydraulic flow through a steering circuit return line to said reservoir when said pressure differential sensing valve detects an instantaneous displacement of said piston pump less than said predetermined limit.

2. The hydraulic circuit of claim 1 wherein said crossover line includes a check valve to prevent back flow of hydraulic fluid from said implement circuit into said steering circuit.

3. The hydraulic circuit of claim 2 wherein one of said hydraulic lines of said implement circuit is an intake line for said piston pump, said intake line being connected to said steering circuit return line from said second priority valve, the flow of hydraulic fluid into said piston pump being taken from said steering circuit return line of said second priority valve.

4. The hydraulic circuit of claim 3 wherein another one of said hydraulic lines of said implement circuit is a implement circuit return line to direct the flow of hydraulic fluid used in said at least one remote valve to said reservoir, said implement circuit return line being coupled to said steering circuit return line to combine the flow of hydraulic fluid therein.

5. The hydraulic circuit of claim 4 wherein steering circuit return line includes a second check valve to prevent the flow of hydraulic fluid from said reservoir into said intake line for said piston pump, said second check valve permitting the flow of hydraulic fluid from said steering circuit return line to return to said reservoir if not taken into said intake line for said piston pump.

6. The hydraulic circuit of claim 5 wherein said pressure differential sensing valve monitors the pressure differential between said piston pump and said at least one remote valve so that said diverted hydraulic flow from said first priority valve is directed to said implement circuit through said crossover line only when said pressure differential sensing valve detects a pressure differential less than a preselected minimum setting for said piston pump.

7. The hydraulic circuit of claim 6 wherein said predetermined limit is substantially said maximum displacement capacity of said piston pump.

8. The hydraulic circuit of claim 6 wherein said predetermined limit is less than said maximum displacement capacity of said piston pump.

9. A hydraulic circuit for a tractor having a hydraulically operated steering mechanism and a hydraulic remote valve stack, said hydraulic circuit having a reservoir, comprising:

a variable displacement piston pump supplying hydraulic fluid under pressure through an implement circuit to said remote valve stack, said piston pump having a maximum displacement capacity and being operable to supply hydraulic fluid upon demand from said implement valve stack;

a fixed displacement gear pump supplying a substantially constant flow of hydraulic fluid under pressure through a steering circuit to said steering mechanism;

a first priority valve in flow communication with said gear pump and being operable to direct hydraulic fluid to said steering mechanism upon demand from said steering mechanism for operation thereof, said first priority valve being operable to divert excess hydraulic flow through a bypass line;

a second priority valve in flow communication with said bypass line to receive said diverted excess hydraulic flow therefrom; and a pressure differential sensing valve operably connected to said second priority valve to control the operation thereof, said pressure differential sensing valve being operable to sense an instantaneous displacement of said piston pump in said implement circuit, said second priority valve being operable to direct said diverted hydraulic flow from said first priority valve through a crossover line to said implement circuit when said pressure differential sensing valve detects an instantaneous displacement of said piston pump greater than a predetermined limit, said second priority valve returning said diverted hydraulic flow through a steering circuit return line to said reservoir when said pressure differential sensing valve detects an instantaneous displacement of said piston pump less than said predetermined limit.

10. The hydraulic circuit of claim 9 further comprising:

a return line returning hydraulic fluid from said second priority valve and from said remote valve stack to said reservoir;

a piston pump intake line supplying hydraulic fluid to said piston pump, said piston pump intake line being connected in flow communication with said return line such that hydraulic fluid pumped through said piston pump is taken from said return line;

a gear pump intake line interconnecting said reservoir and said gear pump for flow communication therebetween; and a check valve in said return line to prevent hydraulic fluid from entering said return line or said piston pump intake line from said reservoir, said check valve permitting the flow of hydraulic fluid from said return line into said reservoir.

11. The hydraulic circuit of claim 10 wherein said crossover line includes a check valve to prevent a back flow of hydraulic fluid from said implement circuit into said steering circuit.

12. The hydraulic circuit of claim 11 wherein said predetermined limit is substantially said maximum displacement capacity of said piston pump.

13. The hydraulic circuit of claim 11 wherein said predetermined limit is less than said maximum displacement capacity of said piston pump.

* * * * *